(12) United States Patent
Persiantsev

(10) Patent No.: US 10,872,400 B1
(45) Date of Patent: Dec. 22, 2020

(54) SPECTRAL SELECTION AND TRANSFORMATION OF IMAGE FRAMES

(71) Applicant: Vulcan Inc., Seattle, WA (US)

(72) Inventor: Michael Persiantsev, Shrewsbury, MA (US)

(73) Assignee: Vulcan Inc., Seattle, WA (US)

( * ) Notice: Subject to any disclaimer, the term of this patent is extended or adjusted under 35 U.S.C. 154(b) by 209 days.

(21) Appl. No.: 16/203,457

(22) Filed: Nov. 28, 2018

(51) Int. Cl.
| | |
|---|---|
| *G06T 5/20* | (2006.01) |
| *G06T 5/00* | (2006.01) |
| *G06T 7/90* | (2017.01) |
| *G06N 20/00* | (2019.01) |
| *G06K 9/46* | (2006.01) |
| *G06T 7/11* | (2017.01) |

(52) U.S. Cl.
CPC .............. *G06T 5/20* (2013.01); *G06K 9/4652* (2013.01); *G06N 20/00* (2019.01); *G06T 5/002* (2013.01); *G06T 5/004* (2013.01); *G06T 5/008* (2013.01); *G06T 7/11* (2017.01); *G06T 7/90* (2017.01); *G06T 2207/10016* (2013.01); *G06T 2207/10024* (2013.01); *G06T 2207/20016* (2013.01); *G06T 2207/20132* (2013.01); *G06T 2207/20182* (2013.01)

(58) Field of Classification Search
None
See application file for complete search history.

(56) References Cited

U.S. PATENT DOCUMENTS

| | | |
|---|---|---|
| 6,424,370 B1 | 7/2002 | Courtney |
| 8,103,116 B1 | 1/2012 | Simonson et al. |
| 8,175,147 B1 | 5/2012 | Webb et al. |
| 8,284,266 B2 | 10/2012 | Deng |
| 8,335,345 B2 | 12/2012 | White et al. |
| 8,339,456 B2 | 12/2012 | Eledath et al. |
| 8,896,713 B2 | 11/2014 | Corey et al. |
| 9,020,261 B2 | 4/2015 | Lipton et al. |
| 9,068,831 B2 | 6/2015 | Monobe et al. |
| 9,378,632 B2 | 6/2016 | Venetianer et al. |

(Continued)

OTHER PUBLICATIONS

Na Li, Jiajun Bu and Chun Chen, "Real-time video object segmentation using HSV space," Proceedings. International Conference on Image Processing, Rochester, NY, USA, 2002, pp. II-II, doi: 10.1109/ICIP.2002.1039893. (Year: 2002).*

(Continued)

*Primary Examiner* — Kim Y Vu
*Assistant Examiner* — Nathan J Bloom
(74) *Attorney, Agent, or Firm* — Davis Wright Tremaine LLP

(57) ABSTRACT

An image comprising a set of pixels is obtained and a dominant hue is determined. A color value of individual pixels in a subset of the set of pixels that fall within the hue range is modified to produce a first transformed image. A filter is applied to the first transformed image or an image derived from the first transformed image to reduce spatial high frequency noise and derive a low frequency image. A high frequency image is generated based on the first transformed image and the low frequency image. Whether the high frequency image depicts the object at a target image frequency is determined based on specified criteria for an object, and if the high frequency image corresponds to the target image frequency, the high frequency image is stored.

21 Claims, 9 Drawing Sheets

(56) References Cited

U.S. PATENT DOCUMENTS

| | | | |
|---|---|---|---|
| 9,413,963 | B2 | 8/2016 | Beysserie et al. |
| 9,554,046 | B2 | 1/2017 | Ardo et al. |
| 9,697,587 | B2 | 7/2017 | Yuan et al. |
| 9,721,172 | B2 | 8/2017 | Wright et al. |
| 9,892,606 | B2 | 2/2018 | Venetianer et al. |
| 9,904,853 | B2 | 2/2018 | Hsu et al. |
| 10,024,965 | B2 | 7/2018 | Nehmadi et al. |
| 10,594,940 | B1 | 3/2020 | Persiantsev |
| 10,685,488 | B1* | 6/2020 | Kumar ............ G06F 3/017 |
| 2002/0141640 | A1* | 10/2002 | Kraft ............ G06T 5/008 382/167 |
| 2003/0053689 | A1* | 3/2003 | Watanabe ........ H04N 1/6077 382/167 |
| 2003/0108250 | A1* | 6/2003 | Luo ............ G06K 9/00664 382/263 |
| 2004/0181747 | A1 | 9/2004 | Hull et al. |
| 2006/0132487 | A1 | 6/2006 | Sada et al. |
| 2008/0170124 | A1* | 7/2008 | Hatanaka ........ H04N 5/23248 348/208.4 |
| 2009/0219401 | A1 | 9/2009 | Drouot |
| 2011/0090344 | A1 | 4/2011 | Gefen et al. |
| 2011/0249029 | A1 | 10/2011 | Baumgart |
| 2012/0002112 | A1 | 1/2012 | Huang et al. |
| 2012/0020524 | A1 | 1/2012 | Ishikawa |
| 2012/0275511 | A1 | 11/2012 | Shemer et al. |
| 2015/0103145 | A1 | 4/2015 | Sakata |
| 2016/0140695 | A1 | 5/2016 | Yuan et al. |
| 2016/0217348 | A1 | 7/2016 | Cho et al. |
| 2016/0292905 | A1 | 10/2016 | Nehmadi et al. |
| 2016/0360148 | A1 | 12/2016 | Mahapatro et al. |
| 2017/0084045 | A1 | 3/2017 | Hsu et al. |
| 2017/0161882 | A1* | 6/2017 | Mantiuk ............ H04N 1/6027 |
| 2017/0272842 | A1 | 9/2017 | Touma et al. |
| 2017/0278219 | A1 | 9/2017 | Yuan et al. |
| 2018/0041716 | A1 | 2/2018 | Kajimura et al. |
| 2018/0098083 | A1 | 4/2018 | McAllister |
| 2019/0089923 | A1 | 3/2019 | Katano et al. |

OTHER PUBLICATIONS

S. M. Mirhassani, B. Yousefi, A. Ahmadyfard and M. Bahadorian, "Motion based unsharp masking [MUSM] for extracting building from urban images," 2008 IEEE International Conference on Systems, Man and Cybernetics, Singapore, 2008, pp. 1280-1284, doi: 10.1109/ICSMC.2008.4811460. (Year: 2008).*

* cited by examiner

SPECTRAL SELECTION AND TRANSFORMATION OF IMAGE FRAMES

BACKGROUND

In order to analyze the movement and velocities of objects of interest in a sequence of frames of a video recording, object detection algorithms are used to identify objects within each frame of the sequence. However, not all objects identified may correspond to the objects of interest that were sought. Furthermore, the object detection algorithms often end up having to sift through various pixel noise, background surfaces, and textures before locating the objects, which can prolong image processing time and result in inefficient use of computer processing resources and memory.

BRIEF DESCRIPTION OF THE DRAWINGS

Various techniques will be described with reference to the drawings, in which.

DETAILED DESCRIPTION

Figure 1:
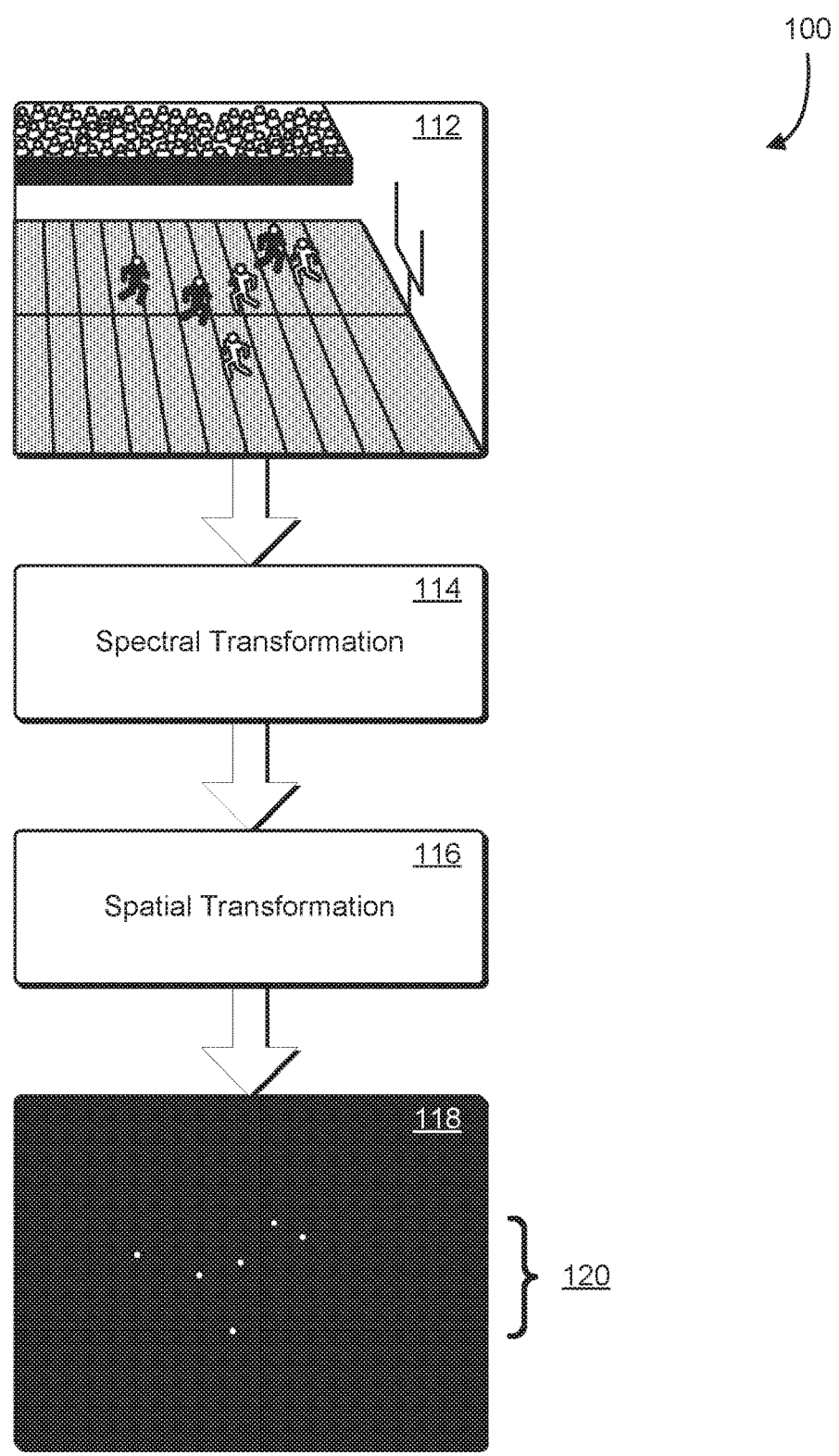
FIG. 1 illustrates an example of transformation of an image frame in accordance with an embodiment.

Techniques and systems described below relate to pre-processing images to enable efficient object detection by performing spectral and spatial transformations to the images. In one example, an image frame of a sequence of image frames is obtained, with the image frame comprising a set of pixels that includes representations of a first object and a second object and the first object being one of a set of objects of interest associated with specified criteria. In the example, a dominant hue of the set of pixels is determined based on a frequency of occurrence of hues in the set of pixels. Further, in the example, a range of hues to modify is determined based on the dominant hue, such that the range of hues includes the dominant hue. Also, in the example, a color characteristic, such as luminosity or saturation, of each pixel in a subset of the set of pixels that fall within the range of hues is modified to produce a spectrally transformed image.

In the example, a spatially transformed image is generated by blurring the spectrally transformed image or an image derived from the spectrally transformed image, generating a high frequency image, and determining whether the high frequency image is the spatially transformed image. In some examples, the blurring, generation of the high frequency image, and determining whether the high frequency image is the spatially transformed image is performed iteratively. For example, a blur function is applied to the spectrally transformed image or an image derived from the spectrally transformed image to derive a low frequency image. Further, in the example, a high frequency image is generated based on differences between the low frequency image and the spectrally transformed image or the image derived from the spectrally transformed image. Then, in the example, whether the high frequency image is the spatially transformed image is determined based at least in part on whether the high frequency image includes a representation of the first object and excludes a representation of the second object.

In the example, representations of one or more objects matching the specified criteria in the spatially transformed image are identified, with the representations including the representation of the first object. Lastly, in the example, information that includes locations of the representations in the spatially transformed image is output. Thus, a two-stage process for enhancing the visibility of objects of interest in images is described in the present disclosure, although it is contemplated that some embodiments may utilize one, but not necessarily both stages. In a first stage, the system and method of the present disclosure applies a color (hue) spectral filtering process to remove one or more predominant colors in the background of the image. In a second stage, the system and method of the present disclosure applies a spatial spectral filtering process to enhance the visibility of the objects of interest.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing; especially the field of digital object detection, by removing or modifying extraneous image data from an image in order to improve the efficiency of object detection within the image. Additionally, techniques described and suggested in the present disclosure improve the efficiency of computing systems that perform object detection in videos by reducing image noise and minimizing the impact of irrelevant background hues on the image detection process. Furthermore, by removing or modifying extraneous image data, image can be condensed, which allows more efficient utilization of storage and memory. Moreover, techniques described and suggested in the present disclosure are necessarily rooted in computer technology in order to overcome problems specifically arising with tracking digital representations of largely homogenous objects in digital images by transforming the digital images into images that can be more efficiently processed by computing devices and object detection algorithms.

FIG. 1 illustrates an example 100 of an embodiment of the present disclosure. Specifically, FIG. 1 depicts the transformation of an initial image 112 according to spectral transformation 114 and spatial transformation 116 techniques of the present disclosure to produce a transformed image 118 that excludes background and noise, leaving specific objects 120 captured in the initial image 112.

In an embodiment, the initial image 112 is a digital image captured by a device for electronic motion picture acquisition or electronic still picture acquisition, referred to in the present disclosure as an image capture device. In embodiments, the image capture device includes an image sensor (e.g., charge-coupled device (CCD) or complementary metal-oxide-semiconductor (CMOS)), memory, image processing capability, and/or a microphone. The image capture device may be designed to record and/or communicate a digital or analog stream of media (e.g., audio, video, text, or any combination of audio, video, or text) in a manner such that the media can be replayed or reproduced on a device designed to display such media. Examples of such image capture devices include a digital video camera, a web camera, mobile telephone, and so on. In embodiments, the video capture device is stationary. However, it is contemplated that certain techniques of the present disclosure may be applied to a non-stationary image capture device. For example, a non-stationary recording device may follow an object in motion (e.g., keeping the object within its field of view).

The initial image 112 may be a two-dimensional image of a scene captured by an image capture device. The initial image 112 may be a numeric (e.g., binary) representation of a two-dimensional image that comprise a set of picture elements (pixels). The initial image 112 may contain a fixed number of rows and columns of pixels holding values that represent the brightness of a given color at that specific point. The initial image 112 may be formatted according to a specific image format, such as Graphics Interchange Format (GIF), Joint Photographic Experts Group (JPEG), Portable Network Graphics (PNG), bitmap (BMP), or Tagged Image File Format (TIFF).

The initial image 112 may be one of a sequence of image frames captured during a video capture event of a scene. As an illustrative example, the scene captured in the initial image 112 is an American football game. Note that the initial image 112 is an image that has not been transformed according to the spectral transformation 114 and spatial transformation 116 techniques described in the present disclosure and, thus, the initial image 112 may be any image in the sequence of image frames.

In an embodiment, the spectral transformation 114 is a process performed by a computing device, such as the computing device*900 of FIG.*9, by multiples of such computing devices in a distributed system of a computing resource service provider, or by any virtual instantiation of such a computing device. The computing device performing the spectral transformation 114 receives the initial image 112 as input, determines at least one dominant hue in the initial image 112, and modifies a color element (e.g., lightness/luminosity, saturation, etc.) of pixels in the initial image 112 having the at least one dominant hue (and/or a range of hues around the dominant hue) to a value (e.g., zero) that improves the ability of a system to efficiently process the image to locate the specific objects 120. For example, the computing device may receive the initial image 112 and perform the spectral transformation 114 to reduce the lightness/luminosity of all pixels in the initial image 112 having a color that coincides with the color of the football field (background) in order to reduce the complexity of the image, thereby allowing for more efficient and accurate object detection. Further details regarding the spectral transformation can be found in the descriptions of FIGS. 2, 3, and 6.

As noted in the present disclosure, depending on the embodiment, the color element modified is one or more of lightness/luminosity, saturation, or some other color element dependent upon the color model used. The determination of which color element to modify may be dependent upon the object detection algorithm to be used to detect the objects within the transformed image 118. For example, if the object detection algorithm to be used most readily detects objects based on contrast, one color element may be preferred for modification, whereas if the object detection algorithm to be used most readily detects objects based on hue, a different color element may be preferred for modification.

In an embodiment, the spatial transformation 116 is a process performed by the same or a different computing device as performed the spectral transformation 114. The computing device performing the spatial transformation may receive the initial image 112 after the dominant hue or hues have been modified from the spectral transformation 114, and then may perform a multiresolution approach, such as a variation of pyramid image processing, for one or more iterations to isolate the high-frequency portions of the image as described in further detail below to produce the transformed image 118.

In some examples, "frequency" refers to the magnitude of the difference between two pixels. For example, a black pixel that changes to a white pixel (or vice versa) may be considered the highest frequency, whereas a pixel that does not change may be considered the lowest frequency. Thus, pixels that undergo the greatest change in value during a blurring or smoothing process will be a higher frequency than pixels that change the least during a blurring or smoothing process.

In an embodiment, the transformed image 118 is a high-frequency version of the initial image 112 such that much of the initial image 112, excluding the specific objects 120, is removed. In this manner, the system of the present disclosure can more efficiently identify and track the specific objects 120 within the transformed image 118. In an application for studying the motion of the specific objects 120, being able to identify and track the specific objects 120 can provide for improved efficiency and processing speed.

In an embodiment, the specific objects 120 are representations in the transformed image 118 that match specified characteristics (e.g., size, color, shape, etc.) of objects of interest. In the illustrative example 100, the specific objects 120 are football helmets. Characteristics of the football helmets are that, depending on the distance and zoom level of the camera that captured the initial image 112 from the field, the representations will be of a certain size within the image (e.g., between 10×10 pixels to 20×20 pixels), that the representations will be more or less circular, and that the colors of the helmets will correspond to colors of each team. Thus, as can be seen, after application of the spectral transformation 114 and the spatial transformation 116, the specific objects 120 (e.g., football helmets) remain in the image while the background surfaces, textures, pixel noise, and objects not matching the specified characteristics have been removed from the transformed image 118.

Figure 2:
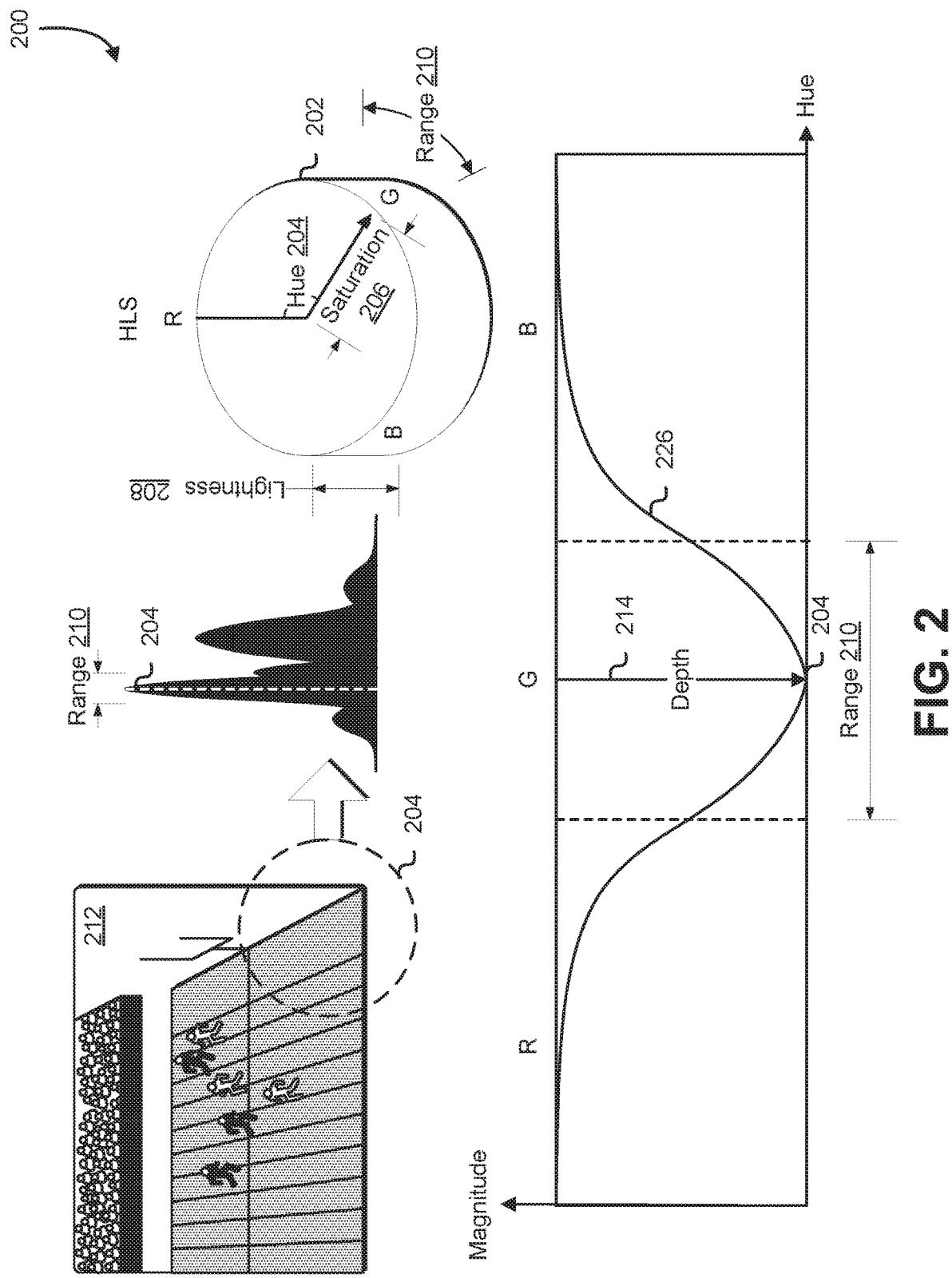
FIG. 2 illustrates an example of spectral selection in accordance with an embodiment.

FIG. 2 illustrates an example 200 embodiment of spectral selection of an embodiment of the present disclosure. Specifically, FIG. 2 depicts a hue, saturation, and lightness (HSL) color model 202 where colors of each hue are arranged in a radial slice around a central axis. A hue, therefore, may be represented by an angle, saturation 206 may be represented by the radial length, and lightness/luminosity 208 may be represented by a vertical distance. The radial length of the saturation 206 may affect the intensity of the pixel's hue, such that a radial length of zero saturation may cause the pixel to render as gray (i.e., the hue loses all intensity). The vertical distance of the lightness/luminosity 208 may range between fully black to fully white.

In an embodiment, the color model 202 is a mathematical model that describes a color component as a tuple of numbers. In some embodiments, the color model 202 is a red, green, blue (RGB) color model in which red, green, and blue light are added together in various ways to reproduce a color. In some of these embodiments, the color model 202 is an alternative representation of the RGP color model, such as a HSV color model or hue, saturation, value (HSV) color model. It is contemplated, however, that techniques of the present disclosure may be used with various other color spaces and models, such as Y'UV, YCbCr, YPbPr, or YCgCo.

In an embodiment, the initial image 212 is similar to the initial image 112 of FIG. 1. The initial image 212 may be comprised of a set of pixels that each has a color value, such as a value for a hue. The hue may be one of the three coordinates of the color model 202 and may represent the degree to which a color appears to be similar to colors of red, green, blue, yellow or a combination of two such colors. The system of the present disclosure may analyze the initial image 212 and keep a count of the number of times each hue occurs within the initial image 212.

The system may determine that the particular hue or range of hues that occur with most frequency in the initial image 212 is the dominant hue 204. In some examples, a "hue" is value representing a particular color in a spectrum of color (e.g., visible light). As depicted in the example 200, the dominant hue 204 in the color model 202 may be represented as an angle from a radial value of zero representing a particular color (e.g., red). As can be seen in the example 200, a football field in the initial image 212 comprises a large part of the initial image 212. Consequently, the system determines the dominant hue 204 to be a value representing a particular hue of green. Although the players, fans, and other background objects also make up a significant portion of the initial image 212, the colors of those objects are distributed along a broader range of hue values. Consequently, the system of the present disclosure determines that the dominant hue is a color of green or range of colors of green that occur with the most frequency in the initial image 212.

Note, however, that the system of the present disclosure may be used to isolate specific objects with known characteristics (e.g., color, size, shape, etc.) that are captured within the initial image 212. If one of the characteristics is a range of colors/hues, those hues may be excluded from the count of the frequency of occurrence of colors in the initial image 212. For example, if the object is to isolate the helmets of the players in the original image and the helmets of one team have hues within a first range in the color model 202 and the helmets of the other team have hues within a second range in the color model 202, in such embodiments the hues within those ranges are not counted during the determination of the dominant hue 204 of the initial image 212. In some embodiments, the hues to exclude from the determination of the dominant hue 204 may be specified by a user of the system (e.g., via a graphical user interface or application programming interface call) of the present disclosure, such as through a user interface, application programming interface call, or configuration file.

In some examples, the saturation 206 is a second of the three coordinates in the color model 202. The saturation 206 may be a value representing an intensity of the hue; that is, the colorfulness of the hue relative to its own brightness. For a particular hue, varying the saturation 206 may change the shade of the hue. For example, a pixel with zero saturation may be rendered as a shade of gray, having lost all of its colorfulness.

In an embodiment, the lightness/luminosity 208, which may also be referred to as "brightness," is a third of the three coordinates in the color model 202. The lightness/luminosity 208 may be a value that represents brightness relative to the brightness of a similarly illuminated white. For example, a hue with a lightness/luminosity of zero may be black, whereas a hue with maximum lightness/luminosity may be white.

In an embodiment, the range 210 is a range of hues, including the dominant hue 204, whose color values are to be modified. For example, in the initial image 212, the dominant hue is a particular hue of the green grass in the football field. However, the green grass of the football field may vary slightly in hue, and consequently the range 210 of hues may encompass more hues than one dominant hue in order to capture most if not all of the hues of the green grass of the football field. In some embodiments, the range 210 includes the dominant hue 204 and a few degrees of hues before and after the dominant hue 204. In some embodiments, the number of hues included before and after the dominant hue 204 can be specified by a user (e.g., via a graphical user interface or application programming interface call). In other embodiments, the number of hues to include in the range 210 is determined dynamically based on the system's analysis of the image; for example, the system may be specified (e.g., by a user or programmer via a user interface, application programming interface call, or configuration file) to include in the range 210, at minimum, hues that comprise at least 20% of the pixels in the initial image 212; e.g., hues of which at least a specified percentage of the image is comprised. In some embodiments, there can be multiple ranges of hues whose values are to be modified. For example, if the dominant hue 204 is green, but the next most common hue in the initial image 212 is red, two ranges of hues may be modified, one around the dominant green hue and the other around the dominant red hue.

Note that, in various examples in the present disclosure, an image of a football field is given. However, it is contemplated that techniques of the present disclosure can be applied to any digital image. Techniques of the present disclosure can be particularly beneficial for images that include narrow ranges of hues that occur with considerable frequency in the image as compared to other hues. As another example, techniques of the present disclosure may be used for identifying and tracking migratory birds against a background of blue sky where a blue hue is identified as the dominant hue and a range of hues that correspond to the sky can be transformed according to techniques of the present disclosure. As yet another example, processes identifying and tracking boats on the ocean may be improved if a range of hues corresponding to the water are spectrally transformed according to techniques of the present disclosure. As still another example, tracking of astronomical bodies captured in images may be aided by spectrally and spatially transforming pixels that do not correspond to objects of interest (e.g., stars, planets, asteroids, etc.) according to techniques of the present disclosure.

In embodiments, hues that are characteristic of the specific objects (e.g., the specific objects 120 of FIG. 1) may be excluded from the range 210. In this manner, the hues of the specific objects may be preserved. For example, if specific objects are football helmets in the initial image 112 and the characteristic hue of the football helmets of a team is green, the particular hue of green may be excluded from the range 210 meant to capture primarily the hues of the green grass of the football field.

The example 200 depicts a modulation curve 226 that illustrates how the hue is to be modulated up to the depth 214. In some embodiments, the modulation curve 226 can be shaped by a user (e.g., the depth 214 can be clicked and dragged up or down via a graphical user interface, the range 210 can be expanded or contracted through a user interface, etc.). In an embodiment, the depth 214 refers to an amount to decrease a characteristic (e.g., saturation, lightness/luminosity, etc.) of pixels of the initial image 212 whose hues are within the range 210. In this manner, the impact on object detection and image processing contributed by pixels that correspond to background areas that are predominantly one color can be reduced.

For example, the complexity introduced by the various hues of a green football field can be neutralized by determining that the dominant hue is a particular hue of green and reducing the lightness/luminosity and/or saturation to zero (or increasing the lightness/luminosity to 100%) of all pixels in the initial image 212 sharing that particular hue, as well as reducing the lightness/luminosity of pixels near in hue (e.g., within the range 210) of the particular hue. The end result of this transformation may be that the football field, if rendered, becomes a near uniform hue of black, grey, or white (depending on the color characteristic modified and in which direction). Note that although the modulation curve 226 is depicted in the example 200 as a gentle curve, it is contemplated that in embodiments the depth 214 could be the same for all pixels within the range 210 (e.g., infinite slope at the edges of the range) or could follow any of a variety of curves. In embodiments, the modulation curve 226 is not symmetrical.

Figure 3:
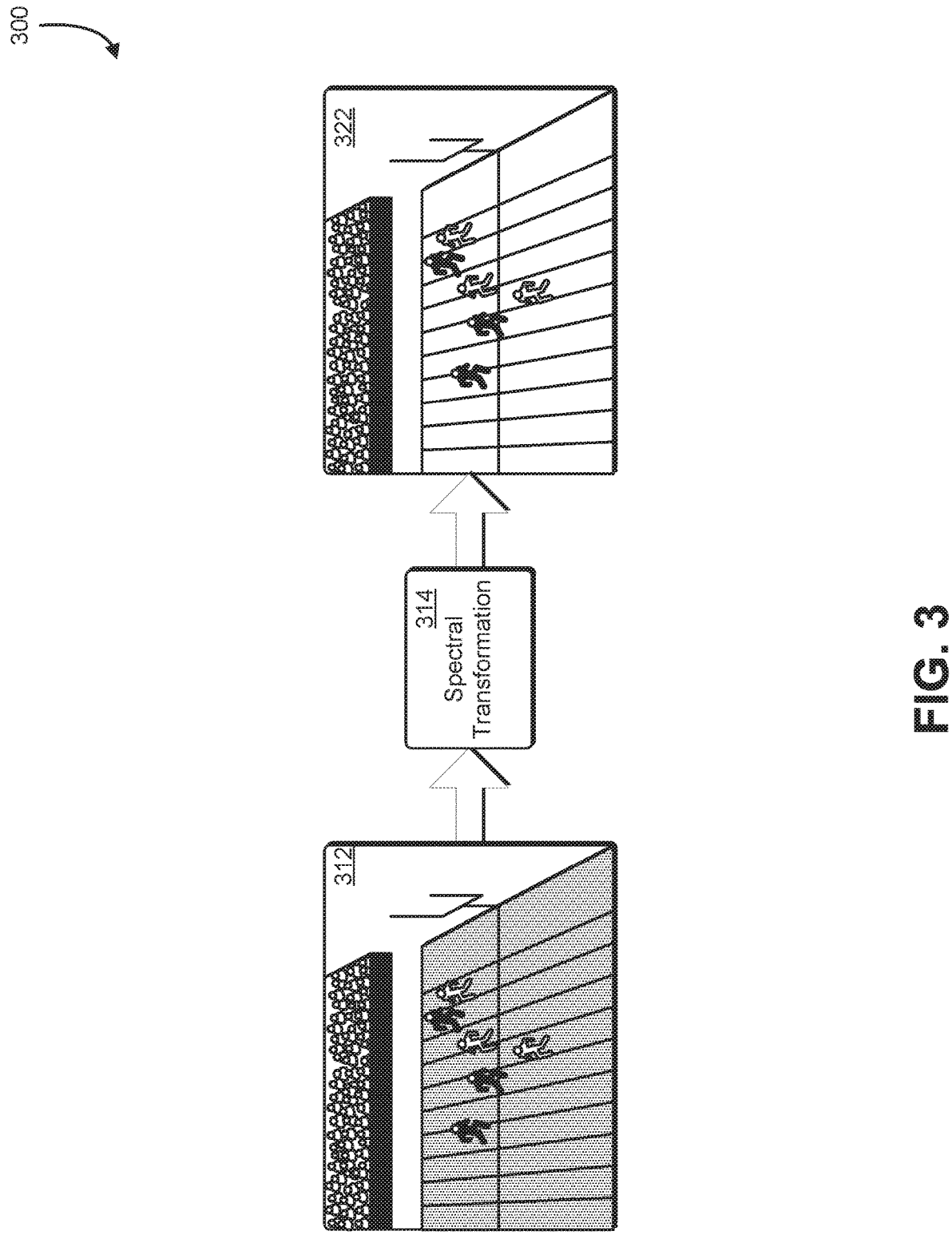
FIG. 3 illustrates an example of transforming an image frame using spectral selection in accordance with an embodiment.

FIG. 3 illustrates an example 300 of an embodiment of the present disclosure. Specifically, FIG. 3 depicts an initial image 302 and a spectrally transformed image 322 produced as a result of a spectral transformation 314. In an embodiment, the initial image 312 is similar to the initial image 112 of FIG. 1. For example, the initial image 312 is illustrated as being a still digital image (e.g., an image frame of a sequence of images comprising a video recording) depicting a scene during an American football game. The initial image 312 is received as input by the system performing the spectral transformation 313.

In an embodiment, the spectral transformation 314 is similar to the spectral transformation 114 of FIG. 1. Thus, the spectral transformation 314 may be a process that, as a result of being performed by a computing device, dynamically identifies one or more dominant hues of the initial image 312 and reduces a characteristic (e.g., lightness/luminosity, saturation, etc.) of pixels in the initial image 312 that have the one or more dominant hue, which results in the spectrally transformed image 322. For example, the computing device performing the spectral transformation 314 may determine that three different hues in the image occur at frequencies more than the standard deviations of hues in the image and, thus, designate the three different hues as dominant hues. Alternatively, the computing device may determine that the most frequently occurring hue in the image is the dominant hue. Likewise, the computing device may dynamically determine a range of hues (e.g., range 210 of FIG. 2) based on what range of hues encompasses at least a threshold proportion of the hues in the image.

In an embodiment, the spectrally transformed image 322 is the resultant image after characteristics of pixels of the initial image 312 corresponding to the one or more dominant hues have been modified. As can be seen in the illustrative example 300, the system performing the spectral transformation 314 has determined that hues corresponding to the football are within a certain range (e.g., the range 210 of FIG. 2) of the dominant hue. A characteristic, such as a lightness/luminosity or saturation characteristic, of the pixels of the football field are then modified. For example, the lightness/luminosity and/or saturation may be maximized such that the football field is rendered to appear white.

By modifying background pixels of the image that are within a certain range of hues to have a maximized or minimized characteristic (e.g., lightness/luminosity or saturation), the contrast between the background and objects of interest (e.g., the football players) is increased. In this manner, detecting the objects within the spectrally transformed image 322 can be performed more efficiently, as the system performing the object detection can quickly identify and disregard such modified pixels as being unassociated with the objects of interest.

Figure 4:
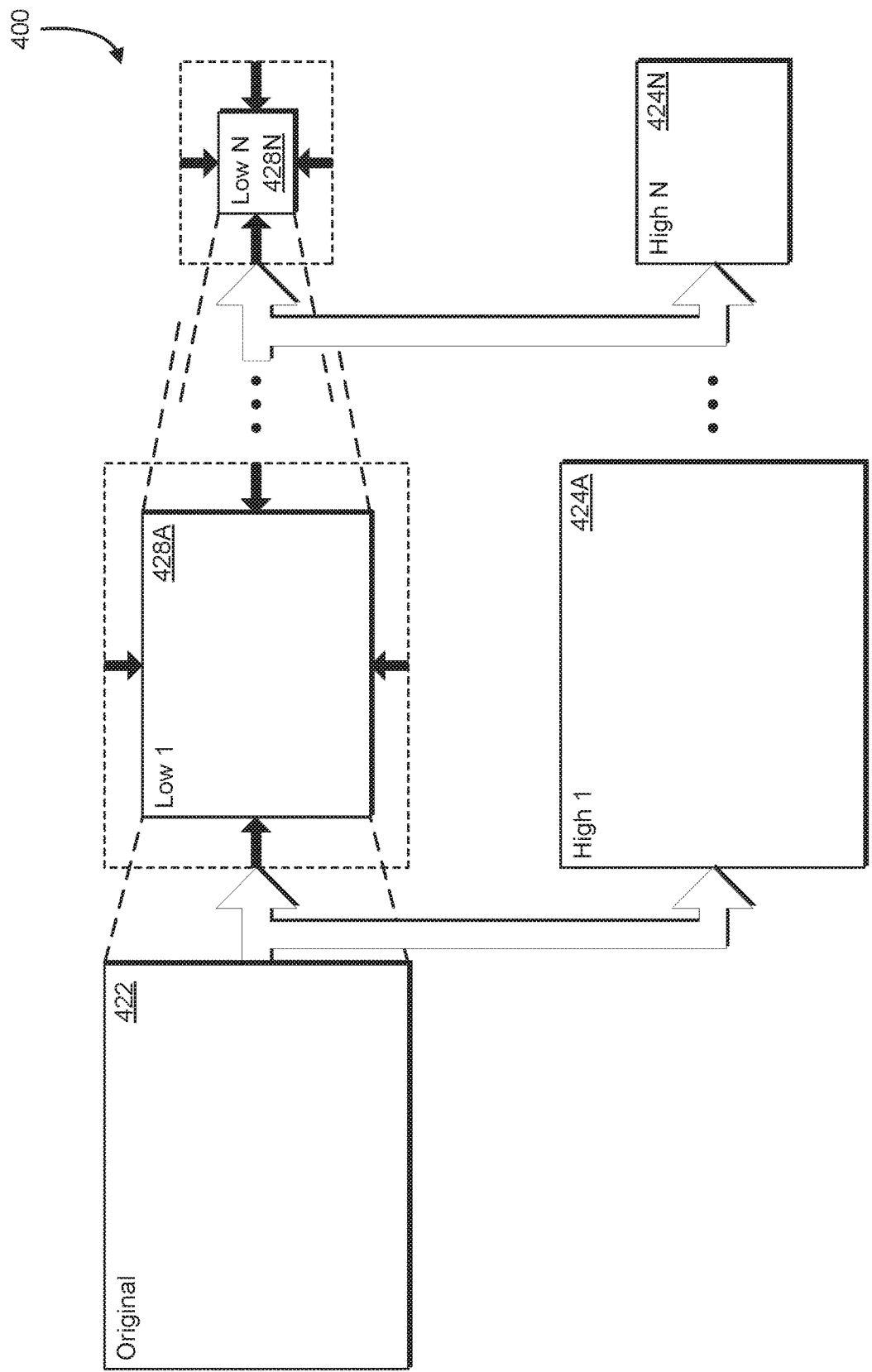
FIG. 4 illustrates an example of spatial selection in accordance with an embodiment.

FIG. 4 illustrates an example 400 of an embodiment of the present disclosure. Specifically, FIG. 4 depicts an original image 422 that undergoes a series of spatial transformations that result in a high-frequency image 418. In an embodiment, the original image 422 is an image that has not been spatially transformed in the manner of the present disclosure. Thus, the original image 422 may be similar to the initial image 112 of FIG. 1 or may be similar to the spectrally transformed image 322 of FIG. 3. That is, the techniques of spatial transformation as described in the present disclosure may be applied independent of or in conjunction with the spectral transformation described in reference to FIGS. 1-3.

In an embodiment, the system of the present disclosure applies a smoothing filter, such as a Gaussian blur function, de-noising function (e.g., the median filter), or other function that reduces spatial high frequency contents to the original image 422, to reduce image noise and detail to produce a first low frequency image 428A. Additionally or alternatively, the first low frequency image 428 may be produced by reducing the size of the original image 422, thereby reducing image noise and detail due to the reduction in image resolution.

The system of the present disclosure then subtracts the first low frequency image 428A from the original image 422 to produce the first high frequency image 424A. That is, the difference between each pixel in the original image 422 and its corresponding pixel in the first low frequency image 428 gives the first high frequency image 424A. As a result, whereas edges and details in the first low frequency image 428A are eliminated or de-emphasized, such edges and details are, in contrast, emphasized in the first high frequency image 424A.

This process may be repeated until an image frequency that isolates the objects of interest is found. For example, the first high frequency image 424A will include the finest image noise and detail (highest frequency) (e.g., depicting individual hairs on a person's head if the original image 422 captured such detail). However, in order to isolate larger objects in the image, such as football helmets, the process may be repeated to find the right frequency for the larger object.

For example, the system of the present disclosure may then blur or reduce the first low frequency image 428A to produce yet another low frequency image (not shown). This other low frequency image may be subtracted from the first low frequency image 428A to result in another high frequency image. This other high frequency image comprises coarser details than the details captured in the first high frequency image 424A because the highest frequency details were already blurred/smoothed out in the first low frequency image 428A. Thus, each time this process is repeated, more and more image noise is eliminated from subsequent high frequency images. This process may be repeated N times, until a final low frequency image 428N is produced that when subtracted from its previous low frequency image (not shown) produces a final high frequency image 424N that is of a frequency that includes the objects of interest but excludes noise and smaller objects. This is further explained in the description of FIG. 5.

Figure 5:
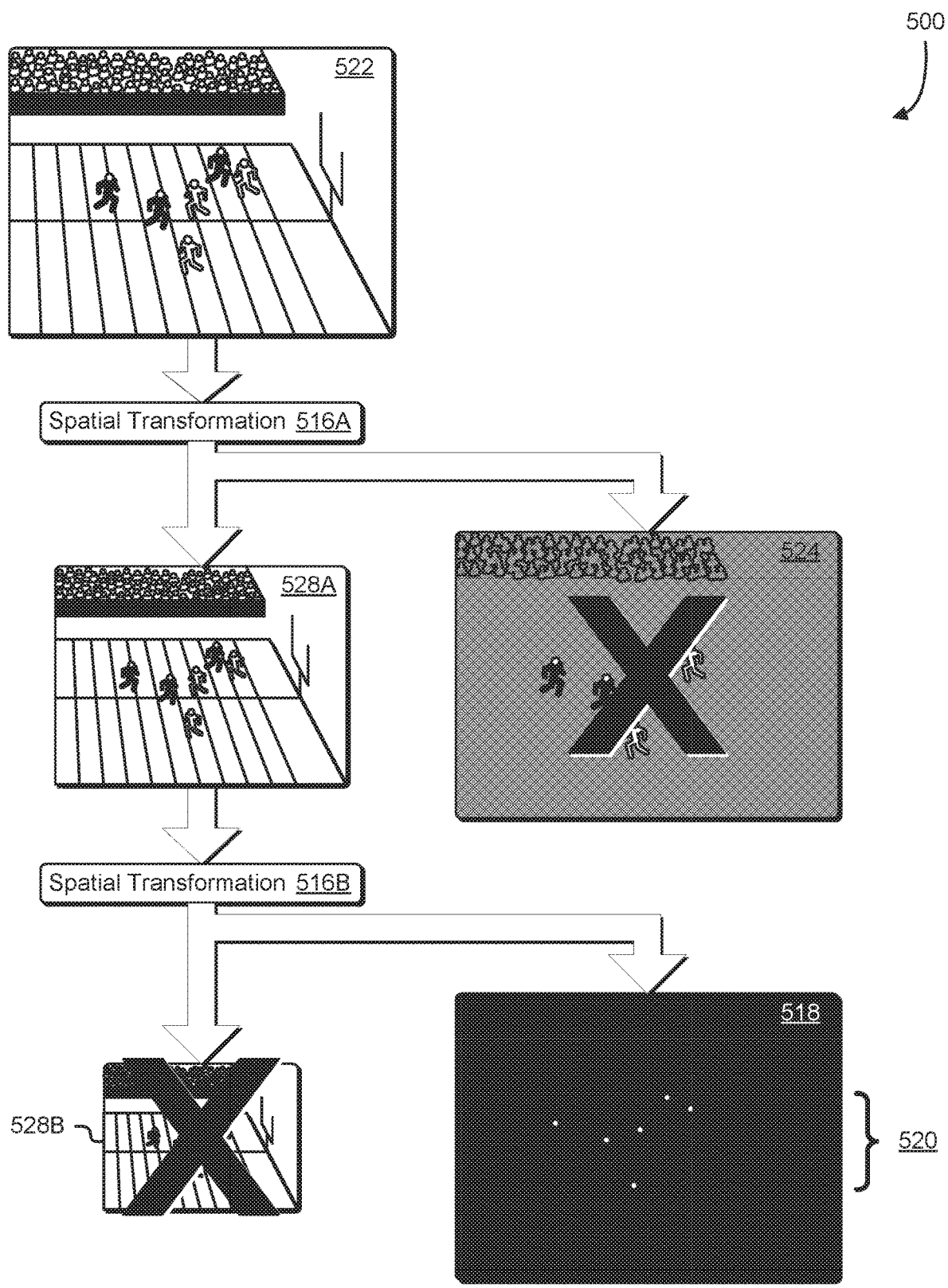
FIG. 5 illustrates an example of transforming an image frame using spatial selection in accordance with an embodiment.

FIG. 5 illustrates an example 500 of an embodiment of the present disclosure. Specifically, FIG. 5 depicts an original image 522, an intermediate spatially transformed image 524, and a final spatially transformed image 518 produced as a result of spatial transformations 516A-16B. In an embodiment, the original image 522 is an image similar to the original image 422 of FIG. 4. For example, the original image 522 may be an image such as the initial image 112 of FIG. 1, of a scene captured by an image capture device. As another example, the original image 522 may be a spectrally transformed image, such as the spectrally transformed image 322 of FIG. 3. That is, the spatial transformation techniques described in the present disclosure may be practiced independently or in conjunction with the spectral transformation techniques described above.

In an embodiment, the spatial transformations 516A-16B are processes being performed by the system of the present disclosure to narrow the image frequency to a band at which the objects 520 can be efficiently detected. For example, the system of the present disclosure may receive the original image 522 as input to the spatial transformation process 516A. The system performing the spatial transformation process 516A transforms the original image 522 in a similar manner as described for the original image 422 of FIG. 4, such as by blurring, de-noising, or otherwise reducing spatial high frequency contents of the original image 522 using a filter (e.g., Gaussian blur, median filter, etc.), and subtracting the blurred image 528 from the original image 522 to produce the intermediate spatially transformed image 524. In an embodiment, the intermediate spatially transformed image 524 is similar to a high frequency image produced in a similar manner as the first high frequency image 424A. Likewise, in an embodiment, the blurred image 528A may be a low frequency image produced in a similar manner as the first low frequency image 428A.

However, as illustrated in the example 500, the intermediate spatially transformed image 524 still includes too many extraneous details (e.g., players' uniforms, fans in the stands, etc.). The system can make the determination that the intermediate spatially transformed image 524 includes too many extraneous details based on information that the system has regarding characteristics of the object 520 of interest. For example, based on the distance of the image capture device from the objects 520 and the size and shape of the objects 520, the system can estimate a size range (in pixels) of the objects appearing in the spatially transformed images 524 and 518. Thus, if a number or percentage of objects in the spatially transformed images 524 and 518 that are smaller than the estimated size range of the objects 520 reach a value relative to a threshold (e.g., meet or exceed the threshold), the system performing the spatial transformation 516A-16B may determine that further spatial transformations should be performed and the intermediate spatially transformed image 524 may be discarded.

Additionally or alternatively, if the system finds that no objects in a spatially transformed image are within the estimated size range of the objects 520 (e.g., all detected objects are too big), the system may determine that too many spatial transformations have been performed and that an earlier spatially transformed image (e.g., the intermediate spatially transformed image 524) is to be the final spatially transformed image 518. Note too that, additionally or alternatively, the number of spatial transformations to be performed may be specified (e.g., by a user via an interface or configuration file) in advance such that the system need not make a determination whether the number of smaller objects in the intermediate spatially transformed image 524 reach a value relative to a threshold; rather, the system may just determine to perform the specified number of spatial transformations.

In the case where the system determines to perform another spatial transformation, the intermediate spatially transformed object is discarded and the system performs another spatial transformation process 516B using the blurred image 528A as input. The blurred image 528A is blurred some more, according to the process, producing another blurred image 528B. Note that although the example 500 depicts only two iterations of the spatial transformation operations 516A-16B, it is contemplated that any number of iterations may be performed, depending on the embodiment and/or characteristics of the objects 520. In the final iteration, the final blurred image is subtracted from the previous iteration's blurred image (e.g., the other blurred image 528B from the blurred image 528A) to produce the final spatially transformed image 518. In an embodiment, the final spatially transformed image 518 is an image that has isolated the frequency of the objects 520 of interest, which in the illustrative example 500 can be seen to be the football helmets of the football players from the original image 522.

In an embodiment, the objects 520 are digital representations in the final spatially transformed image 518 of objects that a user or other entity seeks to track in the image. For example, in the illustrative example 500, the objects to be tracked are the helmets of the football players within the scene. Tracking such objects may be useful for studying kinematics (e.g., the geometry of motion) of the players on the football field. Thus, there may be a plurality of objects comprising the objects 520, and the objects 520 may have similar characteristics to each other (e.g., similar in size, shape, color, etc.). In this manner, although the objects 520 themselves may be essentially homogenous, the objects 520 may be different from other objects in the scene, such as the football, fans in the stands, players on the bench not wearing helmets, the referees, and the rest of the bodies of the football players. These shared characteristics, however, allow the spatial transformation processes described in the present disclosure to be able to isolate, in the final spatially transformed image 518, the objects 520 from other objects in the original image 512.

Note that in some embodiments, the final spatially transformed image 518 could include objects other than the objects 520 of interest, such as, for example, objects larger than the objects 520 of interest (smaller objects having been diminished or eliminated due to the application of blurring/smoothing filters). However, these extraneous objects can themselves be diminished or eliminated by first performing the spatial transformation process yet another time to produce a spatially transformed image where the objects 520 are diminished or eliminated (yet still containing the larger objects), which is then subtracted from the final spatially transformed image 518, producing a spatially transformed image with pixels corresponding to the objects 520 having the most emphasis (e.g., lightness/luminosity, saturation, intensity, etc.). Thus, an object detection algorithm can more efficiently find the objects 520 of interest in the transformed image than the original image 522.

Figure 6:
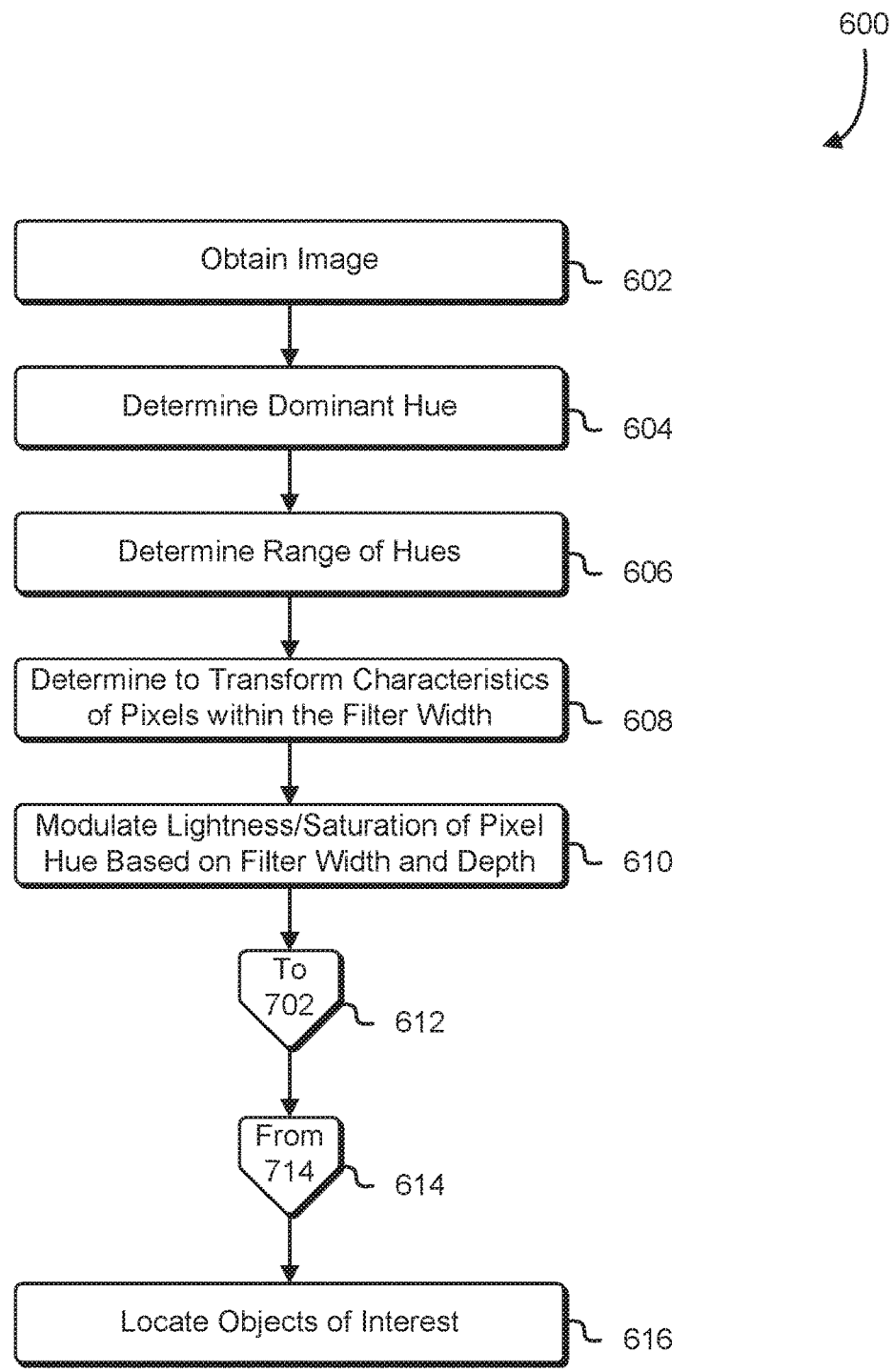
FIG. 6 is a flowchart that illustrates an example of spectral selection and transformation in accordance with an embodiment.

FIG. 6 is a flowchart illustrating an example of a process 600 for spectral selection and transformation of an image in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as the computing device*900 of FIG.*9, by multiple such computing devices in a distributed system of a computing resource service provider, or by any virtual instantiation of such a computing device. The process 600 includes a series of operations wherein an image (e.g., an image from a sequence of images comprising a video recording) that includes one or more particular objects of interest, a dominant hue is identified and pixels of the hue are modified, the image is spatially transformed, and the particular objects of interest are located in the (now-transformed) image.

In 602, the system performing the process 600 obtains an image, such as the initial images 112, 212, or 312 of FIGS. 1-3. The image may be a member of a sequence of images that comprise a video recording of an event. In embodiments, the image includes representations of objects (sometimes referred to as objects of interest) that a user or other entity seeks to locate within the image and/or track such objects as they are recorded in motion in the sequence of images.

In 604, the system performing the process 600 determines one or more dominant hues in the image that are not associated with the objects of interest. In an embodiment, the system may determine a dominant hue by counting the different hues in the image and determining that the particular hue that occurs most frequently in the image is the dominant hue. In in the case where the determined particular hue is a hue that occurs on the objects of interest, the system may determine that the most frequently occurring hue that does not occur on the objects of interest is the dominant hue. In this manner, a background (e.g., ground, grass, sky, water, etc.) that is predominantly a particular hue can be identified as the dominant hue in the image.

In some embodiments, the system may identify more than one dominant hue. For example, the system may identify any hue that is assigned to more than 10% of the pixels in the image and is not a hue that occurs on the objects of interest as being a dominant hue. In this manner, multiple background colors and/or objects that are unassociated with the objects of interest may be identified as having a dominant hue.

In 606, the system determines a range of hues near the dominant hue to transform with the dominant hue. The range of hues may be similar to the range 210 of FIG. 2. A reason for determining a range of hues is that all pixels that correspond to a background may not be captured at a uniform hue, due to environmental factors (e.g., clouds, smoke, dust, etc.), sensitivity or other characteristics of the image capture device, a non-uniform hue of the background itself, or other factors. For example, not all blades of grass have the same hue, so a range of green hues may be determined so as to encompass a majority of a grass background in the range. In some embodiments, the range may be a specified number of hue values to either side of the value of the dominant hue in the color space. In some embodiments, the range may be determined according to a particular algorithm. For example, the range may extend to either side of the dominant hue until the frequency occurrence of the hue values decreases below a specified frequency of occurrence (e.g., half) compared to the frequency of the dominant hue.

In 608, the system determines an amount that a color characteristic of pixels within the range determined in 606 should be modified or, alternatively, a value to which a color characteristic of pixels within the range should be set (e.g., to zero). As noted in the present disclosure, the color characteristic modified may be a component (e.g., lightness/luminosity, saturation, etc.) of a color model. In some embodiments, the value to which the color characteristic is to be set or the amount by which the color characteristic is to be modified depends on the location in the range of hues (e.g., the range 210 of FIG. 2) where the hue of the pixel being modified is located. For example, characteristic values of pixels having hues toward the ends of the range may be modified less than the characteristic values of pixels having hues closer to the dominant hue. Alternatively, the characteristic values of all pixels having hues within the range (e.g., the range 210) may be set to the same value (e.g., zero, one, etc.). In 610, the characteristics of pixels having hues within the range determined in 606 are modified according to the amount determined in 610. The result of this modification results in a spectrally transformed image which, in 612, is provided as input to a system performing the process 700 of FIG. 7 (which may or may not be the same system as performs the process 600).

In 614, the system performing the process 600 receives a spatially transformed image (i.e., the spectrally transformed image after having been spatially transformed) and proceeds to 616. In 616, the system locates the objects of interest within the spatially transformed image. In various embodiments, the system may use object detection techniques, such as one or more of edge detection, corner detection, blob detection, or ridge detection, to locate the objects of interest in the spatially transformed image. Examples of such techniques include Canny edge detector, Sobel operator, Harris & Stephens/Plessey/Shi-Tomasi corner detection algorithms, SUSAN corner detector, level curve curvature, features from accelerated segment test (FAST), Laplacian of Gaussian (LoG), difference of Gaussians (DoG), Monge-Ampère operator, maximally stable extremal regions (MSER), principal curvature-based region detector (PCBR), and grey-level blobs. Note that one or more of the operations performed in 602-16 may be performed in various orders and combinations, including in parallel.

In some embodiments, after the objects of interest have been identified in the spatially transformed image, the system of the present disclosure may crop the edges of the image to exclude portions of the image that do not contain (i.e., lack) the objects of interest. In this manner, the size of the image can be reduced to only include the area containing the objects of interest, which can further allow for more efficient image processing and object detection by reducing the amount of the image that needs to be searched for the objects. In various embodiments, once the objects of interest have been identified, the locations of the objects within the spatially transformed and/or cropped image may be output to storage, such as a file or data store, or may be output to a process that is tracking the motion of the objects of interest in a sequence of images (e.g., a video).

Figure 7:
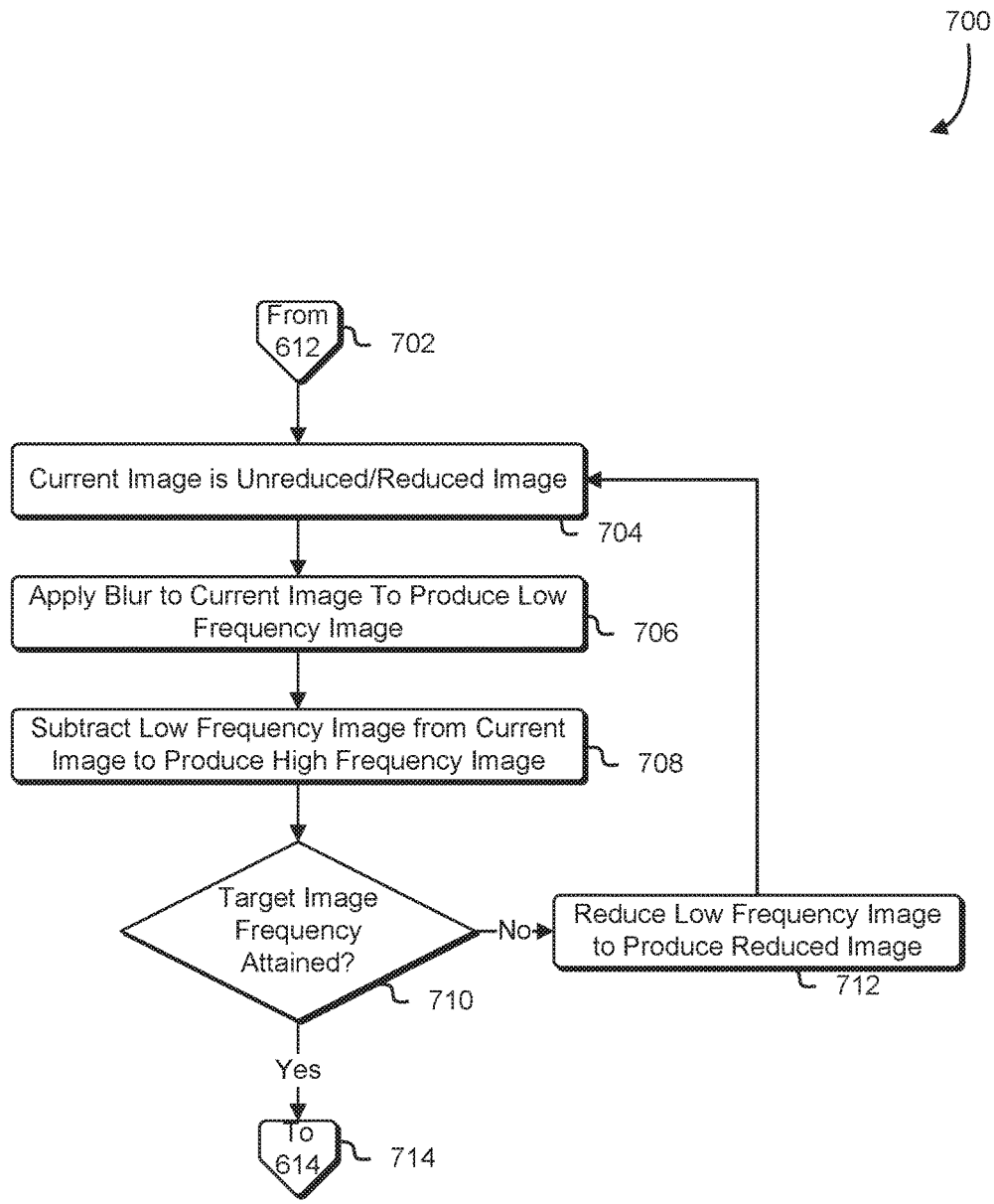
FIG. 7 is a flowchart that illustrates an example of spatial selection and transformation in accordance with an embodiment.

FIG. 7 is a flowchart illustrating an example of a process 700 for spatial selection and transformation of an image in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 9:
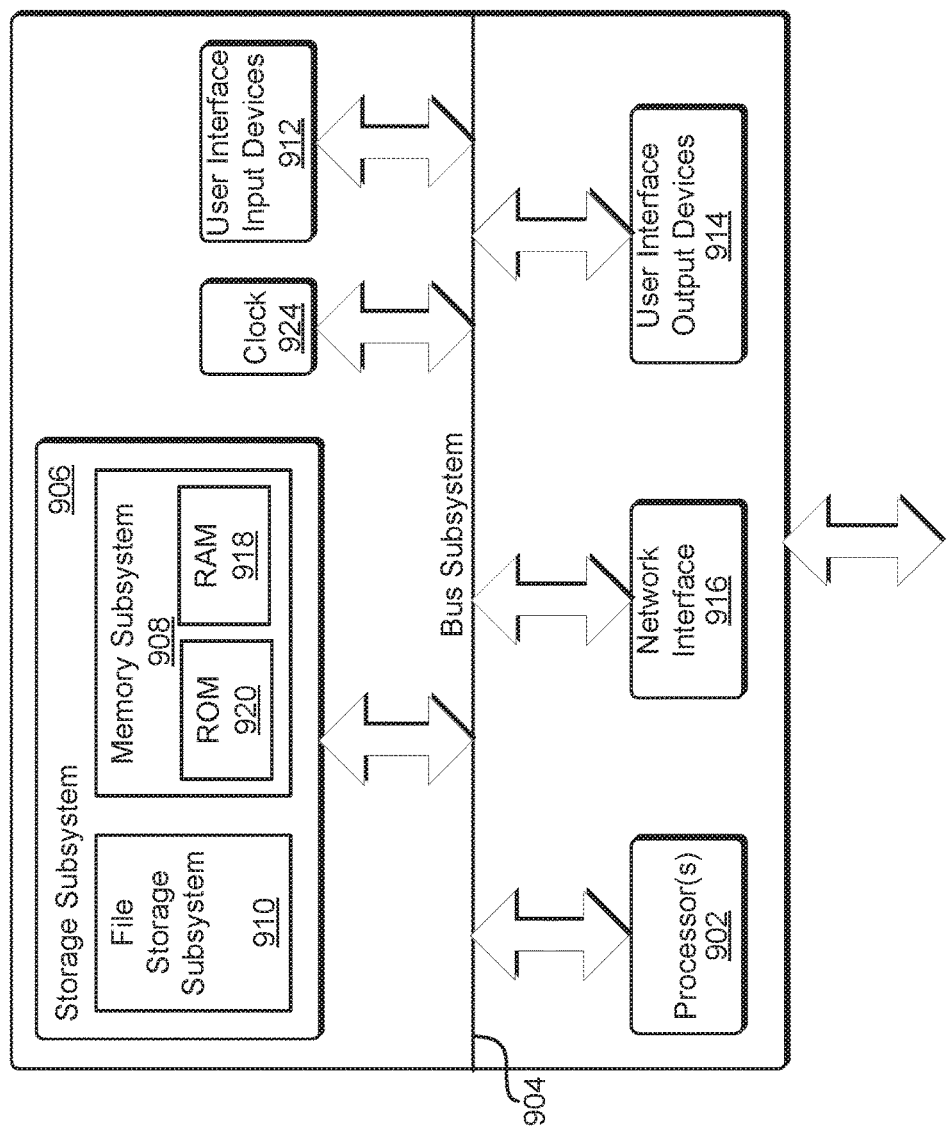
FIG. 9 illustrates an environment in which various embodiments can be implemented.

For example, some or all of process 700 may be performed by any suitable system, such as the computing device 900 of FIG. 9, by multiple such computing devices in a distributed system of a computing resource service provider, or by any virtual instantiation of such a computing device. The process 700 includes a series of operations wherein an image is obtained, blurred and/or reduced as needed, and then subtracted from an image version previous to the current blurring/reduction to produce a spatially transformed image.

In 702, the system performing the process 700 obtains an image, such as the spectrally transformed image provided from the system performing the process 600 of FIG. 6 (which may or may not be the same system performing the process 700). The image obtained, may be similar to the images 422 and 522 of FIGS. 4 and 5 As noted in the present disclosure, the spatial transformation process, such as described in conjunction with operations 704-10, may be performed on an image independently from or in conjunction with the spectral transformation process of the process 600. However, the image obtained, like the image obtained in 602, includes representations of objects (sometimes referred to as objects of interest) that a user or other entity seeks to locate within the image and/or track such objects as they are recorded in motion in the sequence of images.

In 704, initially the current image is an unreduced/unblurred image. In 706, the system performing the process 700 applies a blur filter, such as a Gaussian blur function or median filter, to the current image. As an example, the blur filter may perform an averaging function on one or more of the color values of each pixel in the image, so the pixel color values are averaged with one or more values of adjacent pixels. In this manner, sharp details in the image become softened. Additionally or alternatively, the resolution of the image may be reduced, essentially accomplishing a similar effect as blurring. The image produced may be referred to as a "low-frequency image" in the present disclosure.

In 708, the system performing the process 700 generates a high frequency image by subtracting from the values of each pixel in the current image the values of each corresponding pixel in the low-frequency image. In this manner, the details that were softened in the low-frequency image are preserved and emphasized in the high-frequency image. Note that it is contemplated that if the low-frequency image is a reduced image, there may not be one-to-one correspondence between the pixels of the current image and the low-frequency image; however, it is contemplated that, for the purpose of determining the differences between the two images, based on the amount of the reduction, a corresponding pixel in the low-frequency image to a pixel in the current image may be mathematically determined.

In 710, the system performing the process 700 determines whether the image frequency of the high-frequency image is of the target frequency for locating the objects of interest. In some embodiments, the determination may be made by first performing a trial run on a first image of the sequence to determine an appropriate number of iterations of 704-12 to perform. For example, for each iteration, after performing the operations of 708, the system may perform an object detection algorithm on the high-frequency image and count how many objects in the high-frequency image match the known characteristics (e.g., size, shape, etc.) of the objects of interest. If the number of objects counted has decreased from the previous iteration, the system may determine that the system has performed one too many iterations, and thereafter the system may determine to perform one less iteration than the trial run in the actual performance of the operations 704-12 on images in sequence of images. Thus, in some embodiments, the determination is whether the process 704-12 has been performed a specified number of iterations.

In various embodiments, the system performing the process 700 utilizes machine learning algorithms to determine optimal iterations of the operations of 704, the amount of blurring to perform in 706, and/or the amount to reduce the low frequency image in 712. Such machine learning algorithms may include supervised learning techniques, unsupervised learning techniques, semi-supervised learning techniques, transduction or transductive inference techniques, reinforcement learning, developmental learning, and the like. In various embodiments, the data may be analyzed using one or more machine learning algorithm, such as: decision trees, association rule learning, deep learning, inductive logic programming, support vector machines, cluster analysis, Bayesian networks, naïve Bayes classifiers, learning automata, Gaussian process regression, nearest neighbor, random forest, ordinal classification, k-means clustering, lazy learning, artificial neural network, or generally any suitable machine learning algorithm or combination of algorithms. For example, a set of decision trees can be generated from historical data by splitting data about previous performances of the process 700 into subsets based on an attribute value test and partitioning the data recursively until the splitting no longer adds value to the predictions.

As an example, an equation for a Gaussian blur in two dimensions can be expressed as:

$$G(x, y) = \left(\frac{1}{2\pi\sigma^2}\right)\left(e^{-\frac{x^2+y^2}{2\sigma^2}}\right)$$

Where x is the distance from the origin in the horizontal axis, y is the distance from the origin in the vertical axis, and σ is the standard deviation of the Gaussian distribution. In applying machine learning techniques, the system may vary the amount of σ to determine which standard deviation allows the system to transform the image to the target frequency (e.g., determination in 710) in the least number of processor cycles. Similarly, the system may use machine learning techniques to determine, based on characteristics of the objects of interest (e.g., size, color, shape, etc.) and past performance of the process 700, how many iterations it will take to achieve the target image frequency. Likewise, the system may use machine learning techniques to determine how much the image should be reduced in 712 (e.g., by half, by 25%, etc.).

The same or different machine learning techniques may also be used in determining the range of hues in the operations of 606 if FIG. 6. For example, the system may apply machine learning techniques to determine, based on past performance of the process 600, which hue range and filter depth eliminates the most extraneous image data while retaining the objects of interest within the spectrally transformed image.

If the high-frequency image is not yet at the target frequency, the system may proceed to 712. In 712, in embodiments where the size of the image is not reduced in 706, the system performing the process 700 may reduce the size of the low-frequency image. Because the pixels of the low resolution image have already been blurred/averaged, reducing the size of the low resolution image should not cause any further loss of detail. This reduced image then becomes the current image for the purposes of the next iteration of the operations of 704-712, and due to the reduction in size, the speed of performing of the operations of 704-712 may be improved over the previous iteration.

In some embodiments, the system may perform an operation to remove details of lower frequency than the objects of interest before proceeding to 714. For example, the system may perform another iteration of 704-08, and then subtract this new high-frequency image from the previous high-frequency image. The effect of this operation is that details and objects of lower frequency than the objects of interest are removed in (i.e., excluded from) the resultant difference image.

If the high-frequency image is at the target frequency, the system performing the process proceeds to 714 wherein the high-frequency image is output as the spatially transformed image. In some embodiments, the spatially transformed image is output to the operations of 614 of FIG. 6. In some embodiments, the spatially transformed image is output elsewhere, such as to a file, to a user interface, to a database, or as input to some other process. In some embodiments, the objects of interest may be located in a similar manner as in 616 of the process 600. Note that one or more of the operations performed in 702-14 may be performed in various orders and combinations, including in parallel.

Figure 8:
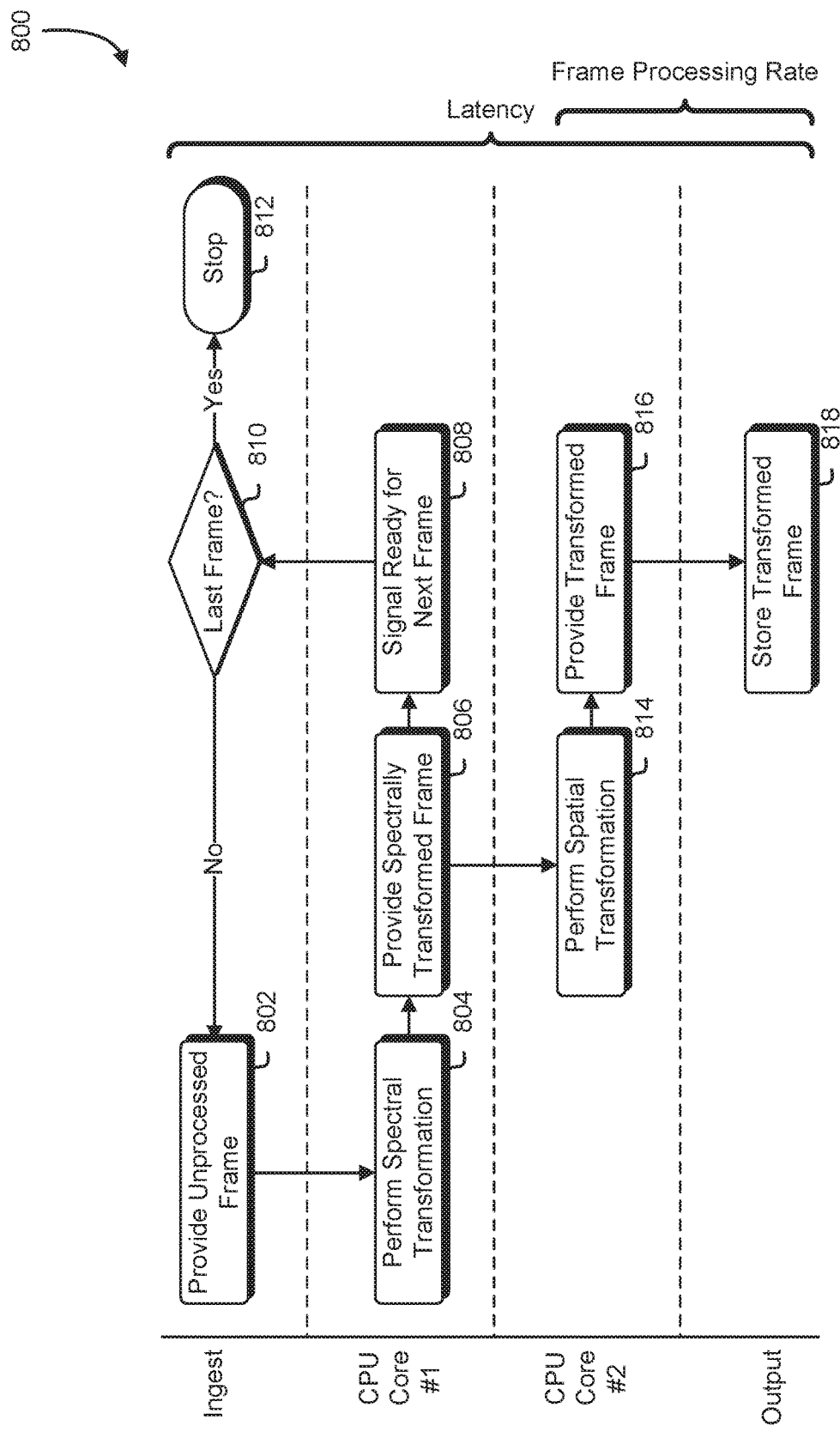
FIG. 8 is a swim diagram that illustrates an example of processing a sequence of image frames in accordance with an embodiment.

FIG. 8 is a flowchart illustrating an example of a process 800 for performing spectral and spatial transformations to a sequence of image frames in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as the computing device*900 of FIG.*9, by multiple such computing devices in a distributed system of a computing resource service provider, or by any virtual instantiation of such a computing device. The process 800 includes a series of operations wherein a pair of central processing unit (CPU) cores operate in parallel to perform spectral and spatial transformations of a series of image frames.

In 802, the system performing the process 800 obtains an unprocessed image frame of a sequence of frames, such as a sequence of frames comprising a video recording of a scene and/or event by an image capture device (e.g., video camera). The system provides the unprocessed image frame to a first CPU core for spectral transformation.

In 804, the first CPU core performs a spectral transformation process to the unprocessed image frame, such as in the manner described in conjunction with FIGS. 2, 3, and 6. In 806, first CPU core, having transformed the unprocessed image frame into a spectrally transformed image frame, provides the spectrally transformed image frame to a second CPU core. Then, in 808, the first CPU core requests signals to the system that the first CPU core is ready to process the next image frame.

In 810, the system determines whether there are any more image frames in the sequence of image frames left unprocessed. If so, the system returns to 802 and provides the first CPU core with the next image frame in the sequence. Otherwise, in 812, the system proceeds to 812 whereupon the ingest portion of the process is concluded.

In 814, the second CPU core, having received the spectrally transformed image frame from the first CPU core, performs a spatial transformation process to the spectrally transformed image frame, such as in the manner described in conjunction with FIGS. 4, 5, and 7. In 816, the second CPU core, having transformed the spectrally transformed image frame into a spatially transformed image frame, provides the spatially transformed image frame as output to the system or to some other system. Once the second CPU core has output the spatially transformed image frame, the second CPU core is ready to receive the next spectrally transformed image frame from the first CPU core.

In 818, the system or some other system stores the spatially transformed image frame to a storage location, such as a file, database, or other storage location. Note that various other operations may be performed alternative to or in addition to 818. For example, an object detection algorithm may be performed against the spatially transformed image frame in order to detect the objects within the spatially transformed image frame. Locations of the detected objects may be stored and compared with locations in subsequent spatially transformed image frames in order to track the motions of the detected objects in the sequence of image frames for kinematic analysis.

The initial latency of the process 800 (i.e., delay between ingest and output) may be the length of time it takes to spectrally and spatially transform one image frame. On the other hand, the frame processing rate may be dependent upon the longest single stage in the process 800. For example, if the operations 814-18 are the longest single stage, once the initial latency has occurred, image frames may be output at the rate it takes to perform the operations 814-18. Note to that FIG. 8 is presented for illustrative purposes only, and it is contemplated that other variations of the process 800 may be used to process the image frames. For example, the CPU cores may alternate the operations that they perform; that is, for efficiency if the second CPU core completes the operations of 814-16 but the first CPU core does not yet have a spectrally transformed image frame ready to provide, the second CPU core may request a next unprocessed image frame and itself perform the operations of 804-08 rather than sit idle waiting for the first CPU core. Similarly, if the first CPU core is ready to provide a spectrally transformed image frame, but the second CPU core is currently busy, the first CPU core may itself go ahead and perform the operations of 814-16 to the spectrally transformed image frame rather than waiting for the second CPU core to finish.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 9 is an illustrative, simplified block diagram of a computing device 900 that can be used to practice at least one embodiment of the present disclosure. In various embodiments, the computing device 900 may be used to implement any of the systems illustrated and described above. For example, the computing device 900 may be configured for use as a data server, a web server, a portable computing device, a personal computer, or any electronic computing device. As shown in FIG. 9, the computing device 900 may include one or more processors 902 that, in embodiments, communicate with and are operatively coupled to a number of peripheral subsystems via a bus subsystem. In some embodiments, these peripheral subsystems include a storage subsystem 906, comprising a memory subsystem 908 and a file/disk storage subsystem 910, one or more user interface input devices 912, one or more user interface output devices 914, and a network interface subsystem 916. Such a storage subsystem 906 may be used for temporary or long-term storage of information.

In some embodiments, the bus subsystem 904 may provide a mechanism for enabling the various components and subsystems of computing device 900 to communicate with each other as intended. Although the bus subsystem 904 is shown schematically as a single bus, alternative embodiments of the bus subsystem utilize multiple buses. The network interface subsystem 916 may provide an interface to other computing devices and networks. The network interface subsystem 916 may serve as an interface for receiving data from and transmitting data to other systems from the computing device 900. In some embodiments, the bus subsystem 904 is utilized for communicating data such as details, search terms, and so on.

In some embodiments, the user interface input devices 912 include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 900. In some embodiments, the one or more user interface output devices 914 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 900. The one or more user interface output devices 914 can be used, for example, to present user interfaces to facilitate user interaction with applications performing processes described and variations therein, when such interaction may be appropriate.

In some embodiments, the storage subsystem 906 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 906. These application modules or instructions can be executed by the one or more processors 902. In various embodiments, the storage subsystem 906 additionally provides a repository for storing data used in accordance with the present disclosure.

In some embodiments, the storage subsystem 906 comprises a memory subsystem 908 and a file/disk storage subsystem 910. In embodiments, the memory subsystem 908 includes a number of memories, such as a main random access memory (RAM) 918 for storage of instructions and data during program execution and/or a read only memory (ROM) 920, in which fixed instructions can be stored. In some embodiments, the file/disk storage subsystem 910 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 900 includes at least one local clock 924. The at least one local clock 924, in some embodiments, is a counter that represents the number of ticks that have transpired from a particular starting date and, in some embodiments, is located integrally within the computing device 900. In various embodiments, the at least one local clock 924 is used to synchronize data transfers in the processors for the computing device 900 and the subsystems included therein at specific clock pulses and can be used to coordinate synchronous operations between the computing device 900 and other systems in a data center. In another embodiment, the local clock is a programmable interval timer.

The computing device 900 could be of any of a variety of types, including a portable computer device, tablet computer, a workstation, or any other device described below. Additionally, the computing device 900 can include another device that, in some embodiments, can be connected to the computing device 900 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 900 for processing. Due to the ever-changing nature of computers and networks, the description of the computing device 900 depicted in FIG. 9 is intended only as a specific example for purposes of illustrating the preferred embodiment of the device. Many other configurations having more or fewer components than the system depicted in FIG. 9 are possible.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated, and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media, and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:
1. A computer-implemented method, comprising:
 obtaining an image frame of a sequence of image frames, the image frame comprising a set of pixels that includes digital representations of a first object and a second object, the first object being one of a set of objects of interest associated with specified criteria;

determining, based at least in part on a frequency of occurrence of hues in the set of pixels, a dominant hue of the set of pixels;

determining, based at least in part on the dominant hue, a range of hues to modify, the range of hues including the dominant hue;

modifying a color characteristic of each pixel in a subset of the set of pixels that fall within the range of hues to produce a spectrally transformed image;

generating a spatially transformed image by iteratively:
applying a high frequency reduction function to the spectrally transformed image or an image derived from the spectrally transformed image to derive a low frequency image;

generating, based at least in part on differences between the low frequency image and the spectrally transformed image or the image derived from the spectrally transformed image, a high frequency image; and determining whether the high frequency image is the spatially transformed image based at least in part on whether the high frequency image:
includes a representation of the first object; and
excludes any representation of the second object;

identifying representations of one or more objects matching the specified criteria in the spatially transformed image, the representations of the one or more objects including the representation of the first object; and outputting information that includes locations of the representations of the one or more objects in the spatially transformed image.

2. The computer-implemented method of claim 1, wherein the color characteristic is a luminosity or saturation value of a pixel.

3. The computer-implemented method of claim 1, wherein the range of hues is a sequence of hues in a color model, the sequence of hues including the dominant hue.

4. The computer-implemented method of claim 1, wherein the high frequency reduction function is a Gaussian blur or median filter.

5. The computer-implemented method of claim 1, further including cropping the spatially transformed image to exclude portions of the spatially transformed image that lack the representations.

6. A system, comprising:
one or more processors; and
memory including executable instructions that, if executed by the one or more processors, cause the system to:
obtain an image comprising a set of pixels;
determine a dominant hue of the set of pixels;
determine, based at least in part on the dominant hue, a hue range;
modify a luminosity or saturation value of individual pixels in a subset of the set of pixels that fall within the hue range to produce a first transformed image;
apply a filter to the first transformed image or an image derived from the first transformed image to derive a low frequency image;
generate, based at least in part on the first transformed image and the low frequency image, a high frequency image;
determine, based at least in part on specified criteria for an object, whether the high frequency image depicts the object at a target image frequency; and
if the high frequency image corresponds to the target image frequency, store the high frequency image.

7. The system of claim 6, wherein:
the low frequency image is a first low frequency image;
the high frequency image is a first high frequency image; and
the executable instructions further cause the system to:
reduce a resolution of the first low frequency image to produce a reduced image;
apply the filter to the reduced image to produce a second low frequency image;
generate, based at least in part on the reduced image and the second low frequency image, a second high frequency image; and
as a result of a determination, based at least in part on the specified criteria, that the second high frequency image depicts the object at the target image frequency, store the second high frequency image.

8. The system of claim 6, wherein the executable instructions that cause the system to generate the high frequency image include instructions that cause the system to generate the high frequency image by, for each pixel in the first transformed image, subtracting a value of a corresponding pixel in the low frequency image from a value of the pixel.

9. The system of claim 6, wherein the image is one of a sequence of images comprising a video recording.

10. The system of claim 6, wherein the one or more processors include:
a first processor core that executes the executable instructions that cause the system to modify the color value of the individual pixels in the subset of pixels to produce the first transformed image; and
a second processor core that executes the executable instructions that cause the system to generate the high frequency image.

11. The system of claim 6, wherein the filter is a spatial high frequency reduction filter.

12. The system of claim 11, wherein the spatial high frequency reduction filter is a Gaussian blur.

13. The system of claim 11, wherein the spatial high frequency reduction filter is a median filter.

14. A non-transitory computer-readable storage medium having stored thereon executable instructions that, if executed by one or more processors of a computer system, cause the computer system to at least:
obtain an image comprising a set of pixels that includes representations of a first object and a second object;
determine a dominant hue of the set of pixels;
determine, based at least in part on the dominant hue, a hue range that includes the dominant hue;
modify a characteristic of individual pixels in a subset of the set of pixels that fall within the hue range to produce a first transformed image;
remove details in the first transformed image to produce a second transformed image;
generate, based at least in part on the first transformed image and the second transformed image, a third transformed image that includes the details;
determine, based at least in part on criteria associated with the first object, that the third transformed image:
includes a representation of the first object; and
excludes a representation of the second object; and
identify representations of one or more objects matching the criteria in the third transformed image.

15. The non-transitory computer-readable storage medium of claim 14, wherein the executable instructions further cause the computer system to crop the third transformed image to exclude portions of the third transformed image that do not contain the one or more objects.

16. The non-transitory computer-readable storage medium of claim 14, wherein the executable instructions that cause the computer system to determine the dominant hue include instructions that cause the computer system to:
   determine a frequency of occurrence of hues in the set of pixels; and
   determine the dominant hue based at least in part on the frequency.

17. The non-transitory computer-readable storage medium of claim 14, wherein the hue range is a range of hues that comprise at least a specified proportion of hues of the set of pixels.

18. The non-transitory computer-readable storage medium of claim 14, wherein the hue range is specified by a user via a user interface.

19. The non-transitory computer-readable storage medium of claim 14, wherein the executable instructions that cause the computer system to modify the characteristic include instructions that cause the computer system to modify the characteristic by setting the characteristic of the individual pixels in the subset of pixels to a same value.

20. The non-transitory computer-readable storage medium of claim 14, wherein the characteristic is at least one of a lightness value or saturation value.

21. The non-transitory computer-readable storage medium of claim 14, wherein the executable instructions that cause the computer system to generate the third transformed image includes instructions that cause the computer system to generate the third transformed image using parameters provided via a machine learning algorithm based at least in part on data about previous image transformations.

\* \* \* \* \*